United States Patent
Kai et al.

(10) Patent No.: US 11,014,548 B2
(45) Date of Patent: May 25, 2021

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Ayaka Kai, Wako (JP); Seiichiro Ishikawa, Wako (JP); Shinichi Okunishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 16/255,888

(22) Filed: Jan. 24, 2019

(65) Prior Publication Data
US 2019/0232944 A1     Aug. 1, 2019

(30) Foreign Application Priority Data
Feb. 1, 2018   (JP) .............................. JP2018-016716

(51) Int. Cl.
    B60W 20/11          (2016.01)
    G05B 13/02          (2006.01)
                 (Continued)

(52) U.S. Cl.
    CPC ............ B60W 20/11 (2016.01); B60W 10/06 (2013.01); B60W 10/08 (2013.01); B60W 20/13 (2016.01);
(Continued)

(58) Field of Classification Search
    CPC ...... B60W 20/11; B60W 20/13; B60W 10/08; B60W 10/06; B60W 2540/043;
(Continued)

(56) References Cited

U.S. PATENT DOCUMENTS 5,948,040 A * 9/1999 DeLorme ............... G01C 21/36
                                                   340/990
2011/0276209 A1* 11/2011 Suganuma ............ B60W 10/06
                                                    701/22
(Continued)

FOREIGN PATENT DOCUMENTS

JP          2012-157201          8/2012

*Primary Examiner* — Jonathan M Dager
*Assistant Examiner* — Jean W Charleston
(74) *Attorney, Agent, or Firm* — Amin, Turocy & Watson, LLP

(57) ABSTRACT

A vehicle control system (1) provided with a power generation unit (13) including an engine (10) and an electric motor (12), a storage battery (60), an electric motor for traveling (18), an acquisition unit (102) that acquires a schedule of an occupant of a vehicle (M), a destination prediction unit (104) that predicts a future destination including a destination which is not registered in the schedule on the basis of past and future schedules and date and time information acquired by the acquisition unit, a traveling planning unit (106) that generates traveling plan information indicating a traveling plan of the vehicle in the future schedule in accordance with a route to the destination predicted by the destination prediction unit, and a power generation control unit (110) that controls the power generation unit in the future schedule on the basis of the traveling plan information generated by the traveling planning unit.

10 Claims, 11 Drawing Sheets

(51) Int. Cl.
*B60W 20/13* (2016.01)
*B60W 10/08* (2006.01)
*B60W 10/06* (2006.01)

(52) U.S. Cl.
CPC ..... *G05B 13/026* (2013.01); *B60W 2510/244* (2013.01); *B60W 2540/043* (2020.02); *B60W 2556/50* (2020.02)

(58) Field of Classification Search
CPC ....... B60W 2556/50; B60W 2510/244; B60W 2050/0064; B60W 2050/0077; B60W 2710/244; B60W 2050/0089; B60W 50/0097; B60W 10/26; B60W 20/12; B60W 10/24; B60W 20/00; B60W 40/00; G05B 13/026; Y02T 10/72; Y02T 10/62; B60K 6/46
USPC .......................................................... 701/22
See application file for complete search history.

(56) References Cited

U.S. PATENT DOCUMENTS

| | | | |
|---|---|---|---|
| 2014/0088810 A1* | 3/2014 | Gehring | B60W 20/12 701/22 |
| 2016/0003631 A1* | 1/2016 | Sund | G01C 21/3492 701/119 |
| 2017/0070089 A1* | 3/2017 | Fukubayashi | H02J 13/00028 |
| 2017/0315556 A1* | 11/2017 | Mimura | G08G 1/167 |
| 2017/0337810 A1* | 11/2017 | Abe | G01C 21/3492 |
| 2018/0215286 A1* | 8/2018 | Fujimoto | B60R 16/037 |
| 2019/0111805 A1* | 4/2019 | Hidaka | B60L 58/10 |

\* cited by examiner

| DATE | DAY OF WEEK | SCHEDULE |
|---|---|---|
| / | MONDAY | |
| / | TUESDAY | |
| / | WEDNESDAY | |
| / | THURSDAY | |
| / | FRIDAY | |
| / | SATURDAY | O'CLOCK -  O'CLOCK GOING OUT: TOURIST RESORT1 |
| / | SUNDAY | O'CLOCK -  O'CLOCK SHOPPING: SHOP 1, SHOP 2 |
| / | MONDAY | |
| / | TUESDAY | |
| / | WEDNESDAY | |
| / | THURSDAY | |
| / | FRIDAY | |
| / | SATURDAY | O'CLOCK -  O'CLOCK SHOPPING: SHOP 1 |
| / | SUNDAY | O'CLOCK -  O'CLOCK FOOD: SHOP 3 |
| / | MONDAY | |
| / | TUESDAY | |
| / | WEDNESDAY | |
| / | THURSDAY | |
| / | FRIDAY | |
| / | SATURDAY | O'CLOCK -  O'CLOCK GOING OUT: TOURIST RESORT3 |
| / | SUNDAY | O'CLOCK -  O'CLOCK SHOPPING: SHOP 4 |

PAST SCHEDULE: rows from first MONDAY through SUNDAY (FOOD: SHOP 3)

FUTURE SCHEDULE: rows from MONDAY through SUNDAY (SHOPPING: SHOP 4)

| DATE AND TIME | DEPARTURE POINT | DESTINATION |
|---|---|---|
| //** (MONDAY) | aa | bb |
| //** (MONDAY) | bb | aa |
| //** (TUESDAY) | aa | bb |
| //** (TUESDAY) | bb | aa |
| //** (WEDNESDAY) | aa | bb |
| //** (WEDNESDAY) | bb | aa |
| //** (THURSDAY) | aa | bb |
| //** (THURSDAY) | bb | aa |
| //** (FRIDAY) | aa | bb |
| //** (FRIDAY) | bb | aa |
| //** (SATURDAY) | aa | cc |
| //** (SATURDAY) | cc | dd |
| //** (SATURDAY) | dd | ee |
| //** (SATURDAY) | ee | aa |
| //** (SUNDAY) | aa | ff |
| //** (SUNDAY) | ff | gg |
| //** (SUNDAY) | gg | hh |
| //** (SUNDAY) | ii | aa |

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2018-016716, filed Feb. 1, 2018, the content of which is incorporated herein by reference.

BACKGROUND

Field of the Invention

The present invention relates to a vehicle control system, a vehicle control method, and a storage medium.

Description of Related Art

A technique in which, in a hybrid vehicle having a storage battery and a driving mechanism (for example, an internal-combustion engine or an electric motor) mounted therein, charging power of the storage battery in an electric automobile is controlled on the basis of an occupant's schedule is known (for example, Japanese Unexamined Patent Application, First Publication No. 2012-157201).

SUMMARY

However, in the related art, controlling charging of the storage battery with respect to a destination which is not registered in an occupant's schedule has not been considered.

The present invention was contrived in view of such circumstances, and one object thereof is to provide a vehicle control system, a vehicle control method, and a storage medium which make it possible to appropriately control a power generation unit in expectation of the future.

A vehicle control system, a vehicle control method, and a storage medium according to this invention have the following configurations adopted therein.

(1) According to an aspect of this invention, there is provided a vehicle control system including: a power generation unit including an engine that outputs motive power used by an electric motor and the electric motor that generates power using the motive power which is output by the engine; a storage battery that accumulates power generated by the power generation unit; an electric motor for traveling, connected to a driving wheel of a vehicle, which rotates the driving wheel by performing drive using power supplied from the power generation unit or the storage battery; an acquisition unit that acquires a schedule of an occupant of a vehicle; a destination prediction unit that predicts a future destination including a destination which is not registered in the schedule on the basis of past and future schedules and date and time information acquired by the acquisition unit; a traveling planning unit that generates traveling plan information indicating a traveling plan of the vehicle in the future schedule in accordance with a route to the destination predicted by the destination prediction unit; and a power generation control unit that controls the power generation unit in the future schedule on the basis of the traveling plan information generated by the traveling planning unit.

(2) In the aspect of the above (1), the vehicle control system further includes a power generation plan generation unit that generates a power generation plan of the power generation unit on the basis of the traveling plan information generated by the traveling planning unit, the power generation plan generation unit generating the power generation plan in which an SOC of the storage battery is determined so that the vehicle travels on the basis of power of the storage battery during a predetermined period in the future schedule, and the power generation control unit controls the power generation unit on the basis of the power generation plan.

(3) In the aspect of the above (2), the destination prediction unit predicts a first destination periodically used by the occupant which is not registered in the schedule on the basis of the past and future schedule and the date and time information acquired by the acquisition unit.

(4) In the aspect of the above (3), the power generation plan generation unit calculates a travelable period in which traveling is possible using the power of the storage battery on the basis of the future schedule, the SOC of the storage battery, and a period in which the first destination is periodically used, and generates the power generation plan to secure power for traveling of the vehicle by causing the power generation unit to generate power so as not to charge the storage battery in a case where the travelable period is shorter than the period in which the first destination is periodically used.

(5) In the aspect of the above (2), the traveling planning unit generates the traveling plan information in which traffic congestion to the destination is reflected on the basis of the future schedule, the date and time information, the destination, and past traffic congestion information, and the power generation plan generation unit generates the power generation plan on the basis of the traveling plan information in which the traffic congestion is reflected.

(6) In the aspect of the above (2), the power generation plan generation unit compares the SOC of the storage battery with a first threshold in the future schedule, causes the power generation unit to generate power in a case where the SOC is set to be equal to or less than the first threshold, and generates a power generation plan in which the SOC is set to be equal to or greater than a target threshold.

(7) In the aspect of the above (2), the vehicle control system further includes a notification control unit that notifies of the fact that charging of the storage battery is unnecessary in a case where it is predicted by the power generation plan generation unit that charging of the storage battery is unnecessary.

(8) In the aspect of the above (2), the power generation plan generation unit predicts power consumption of the vehicle and the SOC of the storage battery on the basis of a traveling distance in the traveling plan generated by the traveling planning unit, and generates the power generation plan of the power generation unit.

(9) In the aspect of the above (2), the traveling planning unit generates traveling plan information associated with a plurality of routes toward the destination predicted by the destination prediction unit, and the power generation plan generation unit generates a plurality of power generation plans of the power generation unit with respect to a plurality of pieces of traveling plan information generated by the traveling planning unit, and selects a power generation plan in which the number of times the storage battery is charged is minimized from among the plurality of power generation plans.

(10) According to an aspect of this invention, there is provided a vehicle control method including causing a computer to: acquire a schedule of an occupant of a vehicle including a power generation unit including an engine that outputs motive power used by an electric motor and the electric motor that generates power using the motive power which is output by the engine, a storage battery that accumulates power generated by the power generation unit, and an electric motor for traveling, connected to a driving wheel of the vehicle, which rotates the driving wheel by performing drive using power supplied from the power generation unit or the storage battery; predict a future destination including a destination which is not registered in the schedule on the basis of acquired past and future schedules and date and time information; generate traveling plan information indicating a traveling plan of the vehicle in the future schedule in accordance with a route to the predicted destination; and control the power generation unit in the future schedule on the basis of the generated traveling plan information.

(11) According to an aspect of this invention, there is provided a computer readable non-transitory storage medium having a program stored thereon, the program causing a computer to: acquire a schedule of an occupant of a vehicle including a power generation unit including an engine that outputs motive power used by an electric motor and the electric motor that generates power using the motive power which is output by the engine, a storage battery that accumulates power generated by the power generation unit, and an electric motor for traveling, connected to a driving wheel of the vehicle, which rotates the driving wheel by performing drive using power supplied from the power generation unit or the storage battery; predict a future destination including a destination which is not registered in the schedule on the basis of acquired past and future schedules and date and time information; generate traveling plan information indicating a traveling plan of the vehicle in the future schedule in accordance with a route to the predicted destination; and control the power generation unit in the future schedule on the basis of the generated traveling plan information.

According to the aspects of the above (1), (2), (10), and (11), it is possible to appropriately control the power generation unit in expectation of the future.

According to the aspect of the above (3), it is possible to generate a power generation plan according to a schedule by predicting a destination which is not registered in the occupant's future schedule.

According to the aspects of the above (4), (6), and (9), it is possible to reduce the number of times the storage battery is charged, and to suppress deterioration of the storage battery.

According to the aspect of the above (5), in a case where there is a plan to travel in a time slot in a case that traffic congestion occurs in a future schedule, it is possible to generate electric power planning for compensating for electric power decreasing due to traffic congestion.

According to the aspect of the above (7), it is possible for an occupant to previously prevent unnecessary charging from being performed.

According to the aspect of the above (8), it is possible to more accurately perform a power generation plan.

BRIEF DESCRIPTION OF THE DRAWINGS

FIG. 4 is a diagram showing an example of content of schedule information of an occupant which is acquired by a schedule acquisition unit.

FIG. 5 is a diagram showing an example of a past traveling history of a vehicle which is driven by an occupant.

DESCRIPTION OF EMBODIMENTS

Hereinafter, an embodiment of a vehicle control system, a vehicle control method, and a computer readable non-transitory storage medium of the present invention will be described with reference to the accompanying drawings.

[Overall Configuration]

Figure 1:
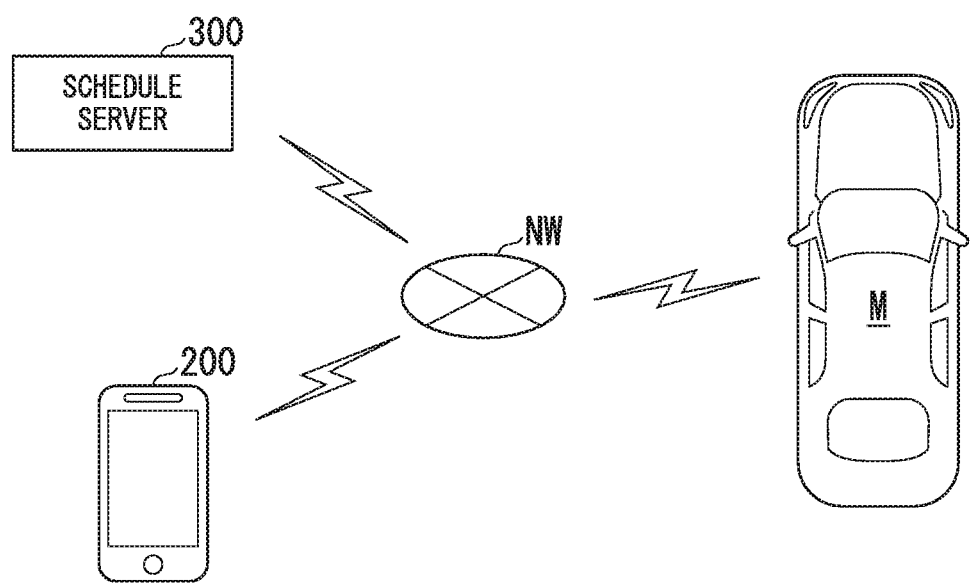
FIG. 1 is a diagram showing a configuration of a vehicle control system.

FIG. 1 is a diagram showing a configuration of a vehicle control system 1. The vehicle control system 1 includes, for example, a vehicle M, a terminal device 200, and a schedule server 300. The vehicle M, the terminal device 200, and the schedule server 300 wirelessly communicate with each other through, for example, a network NW. Communication performed by the vehicle M, the terminal device 200, and the schedule server 300 may be wired communication. The same information or instructions as information or instructions transmitted by the terminal device 200 may be input to the vehicle M through an operation of an operating unit or a touch panel of the vehicle M.

[Terminal Device]

The terminal device 200 is, for example, a smartphone, a tablet-type computer, or the like held by an occupant of the vehicle M. The occupant of the vehicle M can operate the terminal device 200, and input or manage a time at which the vehicle M is used, a destination during its use, a behavior schedule of the occupant, or the like. An application program for schedule management is installed in the terminal device 200. The application program is provided by, for example, a server under the control of an automobile manufacturer. The occupant of the vehicle M may operate the operating unit or the touch panel of the vehicle M, and input or manage a time at which the vehicle M is used, a destination during its use, a behavior schedule of the occupant, or the like.

The terminal device 200 transmits information which is input by the occupant to the vehicle M. The information (for example, destination or use time) which is input by the occupant is acquired and managed by a navigation device of the vehicle M.

[Schedule Server]

The schedule server 300 is a management server that centrally manages an occupant's schedule. The schedule server 300 acquires, for example, the occupant's schedule transmitted from the terminal device 200, and stores schedule information (described later) which is information obtained by associating a calendar stored in a storage unit of the schedule server 300 with the acquired schedule in a storage unit.

The schedule server 300 is synchronized with the terminal device 200 at a timing in a case that a schedule is acquired from the terminal device 200 or at a predetermined timing, and updates the occupant's schedule information. In a case where there is an inquiry of the occupant's schedule from a plan control unit 100 as will be described later, the schedule server 300 provides the plan control unit 100 with the occupant's schedule information. The schedule server 300 may update the occupant's schedule on the basis of information which is input by an operation of the operating unit provided in the vehicle.

[Vehicle]

Figure 2:
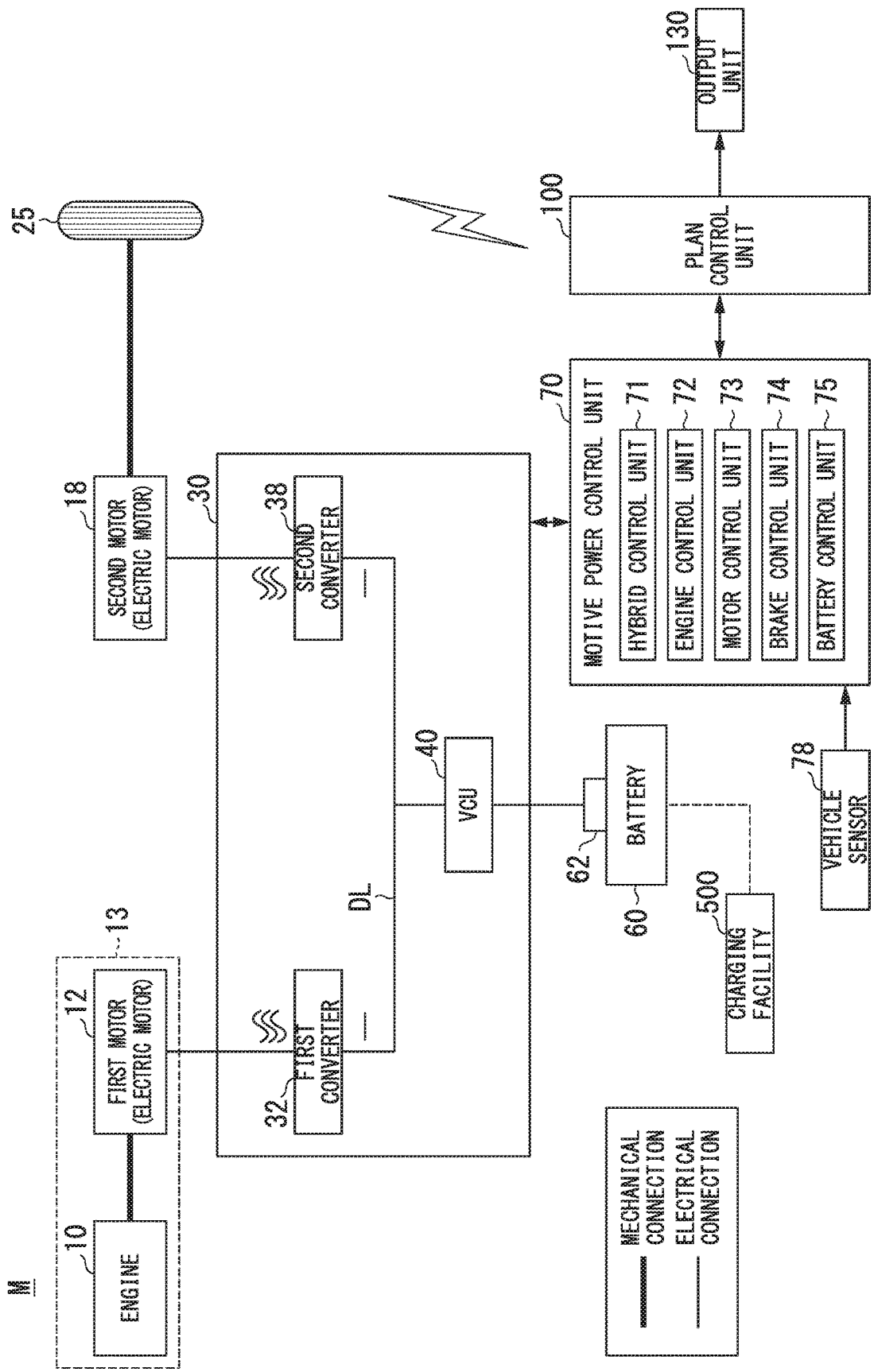
FIG. 2 is a diagram showing an example of a configuration of a vehicle having the vehicle control system mounted therein.

FIG. 2 is a diagram showing an example of a configuration the vehicle M having the vehicle control system 1 mounted therein. The vehicle M having the vehicle control system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. In a case where an electric motor is included therein, the electric motor operates using power generated by an electric motor connected to an internal-combustion engine or discharging power of a secondary battery or a fuel cell. In the following description, a hybrid vehicle having a series type adopted therein will be described by way of example. The series type refers to a type in which an engine and a driving wheel are not mechanically connected to each other, the motive power of the engine is used in power generation performed by an electric motor, and generated power is supplied to an electric motor for traveling. This vehicle may be a battery plug-in chargeable vehicle.

As shown in FIG. 2, examples of components of the vehicle M to be mounted include an engine 10, a first motor (electric motor) 12, a second motor (electric motor) 18, a driving wheel 25, a power control unit (PCU) 30, a battery 60, a motive power control unit 70, a plan control unit 100, and an output unit 130.

The engine 10 is an internal-combustion engine that outputs motive power by burning fuel such as gasoline. The engine 10 is a reciprocating engine including, for example, a cylinder, a piston, an intake valve, an exhaust valve, a fuel injection device, an ignition plug, a connecting rod, a crank shaft, and the like. The engine 10 is, for example, a four-stroke engine, but may have other stroke systems used therein. The engine 10 that is used may be any of a diesel engine, a gas turbine engine, a rotary engine, an external-combustion engine, and the like capable of generating motive power.

The first motor 12 is, for example, a three-phase AC electric motor. The first motor 12 has a rotor connected to the output shaft (for example, crank shaft) of the engine 10, and generates power using motive power which is output by the engine 10.

A combination of the engine 10 and the first motor 12 is an example of the power generation unit 13.

The second motor 18 is, for example, a three-phase AC electric motor. The rotor of the second motor 18 is connected to the driving wheel 25. The second motor 18 outputs motive power to the driving wheel 25 using electric power to be supplied. The second motor 18 generates power using kinetic energy of the vehicle M during deceleration of the vehicle M. Hereinafter, a power generation operation performed by the second motor 18 may be called regeneration.

The PCU 30 includes, for example, a first converter 32, a second converter 38, and a voltage control unit (VCU) 40. The integral configuration of these components as the PCU 30 is merely an example, and these components may be separately disposed.

The first converter 32 and the second converter 38 are, for example, AC-DC converters. The direct-current side terminals of the first converter 32 and the second converter 38 are connected to a direct-current link DL. A battery 60 is connected to the direct-current link DL through the VCU 40. The first converter 32 converts an alternating current generated by the first motor 12 into a direct current and outputs the converted current to the direct-current link DL, or converts an direct current supplied through the direct-current link DL into an alternating current and supplies the converted current to the first motor 12. Similarly, the second converter 38 converts an alternating current generated by the second motor 18 into a direct current and output the converted current to the direct-current link DL, or converts a direct current supplied through the direct-current link DL into an alternating current and supplies the converted current to the second motor 18.

The VCU 40 is, for example, a DC-DC converter. The VCU 40 boosts electric power supplied from the battery 60 and outputs the boosted electric power to the DC link DL.

The battery 60 is a storage battery that accumulates power generated by the power generation unit 13. The battery 60 is a secondary battery such as, for example, a lithium-ion battery. The battery 60 that is used may be any battery which is capable of charging and discharging. In a case where there is a charging facility 500 at a destination, the battery 60 may be charged by the charging facility 500.

The motive power control unit 70 includes, for example, a hybrid control unit 71, an engine control unit 72, a motor control unit 73, a brake control unit 74, and a battery control unit 75. The hybrid control unit 71 outputs instructions to the engine control unit 72, the motor control unit 73, the brake control unit 74, and the battery control unit 75. Instructions output by the hybrid control unit 71 will be described later. The motive power control unit 70 controls the engine 10 of the power generation unit 13 on the basis of a command value which is output by a power generation plan generation unit 108 to be described later, secures the target amount of power, and controls the second motor 18 or the like to thereby control the vehicle M.

The engine control unit 72 performs ignition control, throttle position control, fuel injection control, fuel cut control, or the like of the engine 10 in accordance with instructions from the plan control unit 100. The engine control unit 72 may calculate engine speed on the basis of output of a crank angle sensor attached to the crank shaft, and output the calculated engine speed to the hybrid control unit 71.

The motor control unit 73 performs switching control of the first converter 32 and/or the second converter 38 in accordance with instructions from the hybrid control unit 71.

The brake control unit 74 controls a brake device (not shown) in accordance with the instructions from the hybrid control unit 71. The brake device is a device that outputs a brake torque according to a driver's braking operation to each wheel.

The battery control unit 75 calculates the amount of power (for example, state of charge (SOC)) of the battery 60 on the basis of output of a battery sensor 62 attached to the battery 60, and outputs the calculated amount of power to the hybrid control unit 71 and the plan control unit 100. Hereinafter, the amount of power of the battery 60 may be called the "SOC". The battery control unit 75 monitors the SOC of the battery 60, and in a case where the SOC approaches a predetermined threshold, the battery control unit charges the battery 60 until the SOC reaches a target SOC which is set in advance.

The vehicle sensor 78 includes, for example, an accelerator position sensor, a vehicle speed sensor, a brake stepping amount sensor, or the like. The accelerator position sensor is attached to an accelerator pedal which is an example of an operator that accepts a driver's acceleration instruction, detects the operation amount of the accelerator pedal, and outputs the detected operation amount as an accelerator position to the motive power control unit 70. The vehicle speed sensor includes, for example, a wheel speed sensor and a speed calculator attached to each wheel, derives the speed (vehicle speed) of the vehicle M by integrating wheel speeds detected by the wheel speed sensor, and outputs the derived speed to the motive power control unit 70. The brake stepping amount sensor is attached to a brake pedal which is an example of an operator that accepts a driver's deceleration or stop instruction, detects the operation amount of the brake pedal, and outputs the detected operation amount as a brake stepping amount to the motive power control unit 70.

Here, control performed by the hybrid control unit 71 will be described. The hybrid control unit 71 determines engine power Pe to be output by the engine 10 on the basis of an instruction of the plan control unit 100. The hybrid control unit 71 determines the reaction torque of the first motor 12 so as to balance with the engine power Pe in accordance with the determined engine power Pe. The hybrid control unit 71 outputs the determined information to the engine control unit 72. In a case where a brake is operated by a driver, the hybrid control unit 71 determines the distribution of a brake torque capable of being output by the regeneration of the second motor 18 and a brake torque to be output by the brake device, and outputs the determined distribution to the motor control unit 73 and the brake control unit 74.

The output unit 130 is, for example, a touch panel display or a speaker. The output unit 130 notifies an occupant of information relating to charging of the battery 60 or a power generation plan through a sound or an image. The output unit 130 may be a display unit of a navigation device, or may accept an occupant's input operation.

[Plan Control Unit]

The plan control unit 100 controls the amount of power required for traveling of the vehicle M on the basis of a traveling plan of the vehicle M during movement from a departure point to a destination. The plan control unit 100 controls the amount of power so as to reduce the number of times the battery 60 is charged in order to extend the lifetime of the battery 60. In a series-type vehicle, for example, in a case where charging is controlled so that the battery 60 is charged and discharged for each trip in which a vehicle moves, the number of times the battery 60 is charged and discharged becomes larger, and deterioration of the battery 60 may proceed. For this reason, it is preferable to reduce the number of times the battery 60 is charged and discharged as much as possible.

Figure 3:
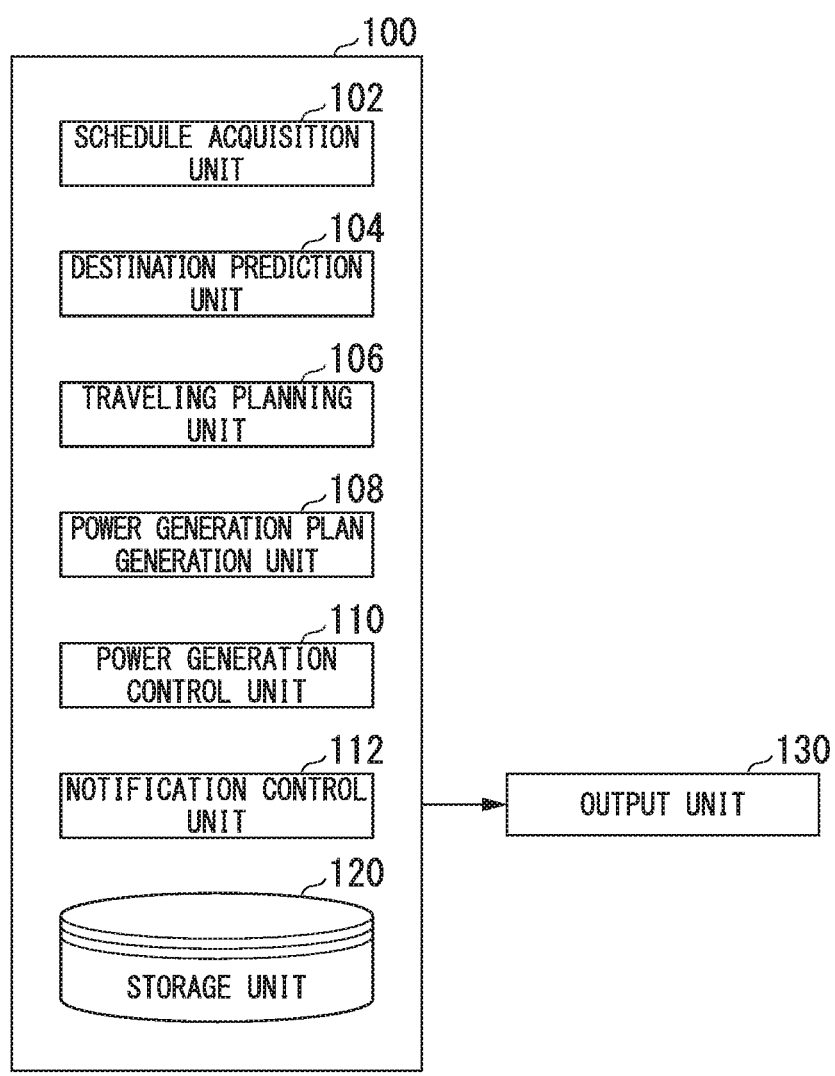
FIG. 3 is a configuration diagram showing a functional configuration of a plan control unit.

FIG. 3 is a configuration diagram showing a functional configuration of the plan control unit 100. The plan control unit 100 includes, for example, a schedule acquisition unit 102, a destination prediction unit 104, a traveling planning unit 106, a power generation plan generation unit 108, a power generation control unit 110, a notification control unit 112, and a storage unit 120. Among these functional units, the schedule acquisition unit 102, the destination prediction unit 104, the traveling planning unit 106, the power generation plan generation unit 108, the power generation control unit 110, and the notification control unit 112 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by cooperation between software and hardware.

The storage unit 120 is realized by, for example, a non-volatile storage device such as a read only memory (ROM) or an electrically erasable and programmable read only memory (EEPROM), or a volatile storage device such as a random access memory (RAM) or a register.

The storage unit 120 stores, for example, schedule information to be described later, traveling plan information, information required in a case that a traveling plan is generated, or a traveling history. These pieces of information may be acquired by communication with a server device or the like, or may be stored in the storage unit 120 in advance.

The schedule acquisition unit 102 acquires a schedule of an occupant of the vehicle M. The schedule acquisition unit 102 is connected to the schedule server 300 through the network NW, and acquires schedule information relating to a schedule. The schedule acquisition unit 102 may be connected directly to the terminal device 200 of the occupant to thereby acquire schedule information relating to a schedule. The schedule information is information in which a schedule, a date, and a day of the week are associated with each other (see FIG. 4). The schedule information may be input by the occupant of the vehicle M operating an operating unit provided in the vehicle M and be stored in the storage unit 120. The schedule information stored in the storage unit 120 is transmitted to the schedule server 300 or the terminal device 200 at a predetermined timing. The schedule server 300 acquires the schedule information transmitted from the vehicle M, and updates the acquired schedule information and the occupant's schedule information stored in a host device.

The schedule acquisition unit 102 acquires, for example, the past several weeks' worth of schedule information and a future predetermined period's worth of data. The predetermined period's worth of data is, for example, a week's worth of schedule information.

FIG. 4 is a diagram showing an example of content of schedule information G100 of an occupant which is acquired by the schedule acquisition unit 102. The schedule information G100 may include, for example, not only an occupant's future schedule but also the past schedule.

The schedule acquisition unit 102 determines, for example, an occupant's days of work and holidays on the basis of the schedule information G100. For example, the schedule acquisition unit 102 may refer to a schedule recorded in the schedule information G100. Since the occupant normally does not register a schedule of days of work, for example, a schedule from Monday to Friday may be empty in the schedule information G100. In a case where there are a lot of schedules, for example, on Saturdays and Sundays, the schedule acquisition unit 102 estimates (assumes) Saturday and Sunday to be holidays. The schedule acquisition unit 102 estimates a schedule to be days of work, for example, in a case where a schedule from Monday to Friday in the schedule information G100 is not written, or case where information (information such as a place of work or a meeting schedule) relating to work is stored in the schedule information. The information relating to work is, for example, information registered in advance or information based on a result in which the past schedule information and a traveling history of a vehicle have been learned.

The days of work are assumed to be, for example, weekdays from Monday to Friday in the above-described example, but there is no limitation thereto. The days of work may be estimated on the basis of an occupant's behavior pattern, for example, by the schedule acquisition unit 102 referring to the past schedule. The schedule acquisition unit 102 may estimate Thursday to Tuesday to be days of work on the basis of the above-described process in the past schedule, and estimate Wednesday as a holiday.

The schedule acquisition unit 102 refers to the past traveling history (including date and time information) stored in the storage unit 120, for example, in order to verify the estimation result. In a case where an occupant commutes to his or her place of work by car, daily periodic trips from his or her home to the place of work on the days of work (for example, from Monday to Friday) are recorded in a history of the past traveling plan. In this case, in a case where days of the week on which periodic trips are stored and days of the week estimated in the above process are identical with each other, the schedule acquisition unit 102 determines the days of the week to be days of work. The schedule acquisition unit 102 stores the determination results (days of work or holidays) in the storage unit 120 in association with the schedule information G100.

The destination prediction unit 104 predicts a destination on the days of work acquired by the schedule acquisition unit 102. For example, the destination prediction unit 104 predicts a future destination including a destination (for example, place of work) which is not registered in the occupant's schedule information on the basis of the past and future schedule information acquired by the schedule acquisition unit 102.

For example, in a case where a destination is registered in the occupant's schedule information, the destination prediction unit 104 determines whether the occupant goes toward this destination using the vehicle M. This is because the vehicle M is not necessarily used in order to go to a registered destination.

The destination prediction unit 104 retrieves whether the vehicle M is used in order to go to a destination registered on the basis of the past schedule and the traveling history of the vehicle M. In a case where it is determined that the vehicle is used to go to a destination registered in the traveling history of the vehicle M, the destination prediction unit 104 predicts the registered destination to be the occupant's destination.

For, example, in a case where a destination is not registered in a schedule, the destination prediction unit 104 predicts a first destination which is periodically used by the occupant. The destination prediction unit 104 extracts, for example, days of work based on the determination result of the schedule acquisition unit 102. The destination prediction unit 104 refers to the past schedule information, the traveling history or the like, and predicts a destination (for example, place of work) which is periodically used on days of work as the first destination.

FIG. 5 is a diagram showing an example of a past traveling history H100 of the vehicle M which is driven by an occupant. The destination prediction unit 104 estimates a destination according to the date and time information every day in a predetermined period of the acquired schedule. The destination prediction unit 104 refers to the traveling history H100, and predicts the first destination on days of work on the basis of the determination results of days of work and holidays acquired by the schedule acquisition unit 102. The destination prediction unit 104 refers to, for example, the traveling history H100, and extracts trips on days of work (for example, Monday to Friday). Monday to Friday in FIG. 5 are an example of "period in which the first destination is periodically used".

On each day of work in the traveling history H100, for example, a trip of movement from a departure point "aa" to a destination "bb" in the morning followed by movement from a departure point "bb" to a destination "aa" in the evening is periodically performed. From this, the occupant's trip on days of work is estimated for the occupant to go to work from his or her home "aa" to the place of work "bb", and to return home from the place of work "bb" to his or her home "aa" during the same day.

The destination prediction unit 104 predicts that "aa" is home and "bb" is the first destination on the basis of the analysis result of the traveling history H100. The destination prediction unit 104 adds, for example, a schedule for the first destination which is not registered on days of work of the occupant's future schedule to the schedule information G100 on the basis of the destination prediction result (see FIG. 4).

The traveling planning unit 106 generates a route to a destination predicted by the destination prediction unit 104. The traveling planning unit 106 generates traveling plan information indicating a traveling plan of the vehicle M in a future schedule in accordance with the generated route. The traveling plan is a plan to which an estimated time of arrival at a destination, traffic congestion information of a road, a route through which a user desires to pass, the type of road through which the user desires to pass, or the like is added.

The traveling planning unit 106 generates, for example, a week's worth of traveling plan associated with a future schedule. The traveling planning unit 106 may generate a plurality of routes toward a destination, and generate a traveling plan associated with the generated plurality of routes. The power generation plan generation unit 108 determines whether a plurality of pieces of traveling plan information are generated by the traveling planning unit 106. In a case where it is determined that the plurality of pieces of traveling plan information are generated, the power generation plan generation unit generates a plurality of power generation plans of the power generation unit 13 with respect to the plurality of pieces of traveling plan information, and selects a power generation plan in which the number of times the battery 60 is charged is minimized from among the plurality of power generation plans.

Information indicating a traveling plan is displayed on, for example, a display unit of a navigation device, and the occupant of the vehicle M controls the vehicle M in accordance with the traveling plan displayed on the display unit. The vehicle M of the present embodiment may be an automated driving vehicle that automatically controls the steering and acceleration of the vehicle M on the basis of the traveling plan and the peripheral situation of the vehicle M.

In a case where traffic congestion to a destination is reflected, the traveling planning unit 106 generates a traveling plan as follows. In a case where a tourist resort is registered as a destination, for example, on a holiday included in a future schedule, the traveling planning unit 106 acquires the past traffic congestion information of a route to a destination, calculates a time required to reach the destination, and generates traveling plan information in which traffic congestion to the destination is reflected. The traveling planning unit 106 acquires, for example, the past traffic congestion information through the network NW. The traveling planning unit 106 stores the generated traveling plan information in the storage unit 120.

Besides, the traveling planning unit 106 may acquire, for example, weather information in a future schedule through connection to the network NW, and generate information a traveling plan based on the weather. The traveling plan based on the weather is an occupant' characteristic plan according to the weather. For example, in a case where characteristic behavior such as taking a user (for example, family) to and from a station by car on a rainy day is extracted from the past behavior history, the traveling planning unit 106 generates a traveling plan which is assumed on a rainy day.

In a case where the traffic congestion information and other road information are acquired in real time, a case where the power generation plan is changed by the power generation plan generation unit 108 as will be described later, or the like, the traveling planning unit 106 may generate the traveling plan information by performing rerouting appropriately.

The power generation plan generation unit 108 generates the power generation plan of the vehicle M supplied with power by the power generation unit 13 on the basis of the traveling plan information generated by the traveling planning unit 106. The power generation plan is a demand and supply plan in the vehicle M supplied with power by the power generation unit 13. The power generation plan includes a charging schedule of the charging facility 500 and a refueling schedule performed by the occupant in addition to the SOC management of the battery 60 performed by the power generation unit 13 or a schedule of supply of power to the second motor 18. The refueling schedule is a schedule in which the amount of power generated by the power generation unit 13 is monitored and refueling is performed in a case of reaching a predetermined value.

The power generation plan generation unit 108 generates, for example, a normal energy management plan (power generation plan) required for a one-day or one-time trip and a long-term energy management plan (the details thereof will be described later). The power generation plan generation unit 108 generates, for example, a power generation plan in which the SOC of the battery 60 is determined so that the vehicle M travels on the basis of electric power of the battery 60 during a predetermined period in a future schedule.

The power generation plan generation unit 108 derives a target amount of power from a point A to a point B on the basis of the traveling plan generated by the traveling planning unit 106. The power generation plan generation unit 108 sets a target SOC of the battery 60 on the basis of the derived target amount of power.

The power generation plan generation unit 108 predicts the power consumption of the vehicle M and the SOC of the battery 60 on the basis of a traveling distance in the traveling plan generated by the traveling planning unit 106, and generates a power generation plan of the power generation unit 13. The power generation plan generation unit 108 sets a target SOC at the time of the end of traveling, and sets a target SOC of the battery 60 at the time of start of traveling. The power generation plan generation unit 108 generates the power generation plan on the basis of the SOC of the battery 60.

The power generation plan generation unit 108 monitors an actual SOC of the battery 60 acquired by the battery control unit 75 at a predetermined timing, and appropriately generate the power generation plan on the basis of the actual SOC.

The power generation control unit 110 generates power required for traveling of the vehicle M by controlling the power generation unit 13 on the basis of the power generation plan generated by the power generation plan generation unit 108, and generates power required for charging the battery 60. The generation of power required for traveling of the vehicle M and the generation of power required for charging the battery 60 are not necessarily performed simultaneously, and only power required for traveling of the vehicle M may be generated by the power generation unit 13.

The notification control unit 112 controls the output unit 130. The notification control unit 112 causes the output unit 130 to display the power generation plan generated by the power generation plan generation unit 108. In a case where it is determined that a plurality of pieces of traveling plan information are generated, the power generation plan generation unit 108 may cause the output unit 130 to display a route relating to the plurality of pieces of traveling plan information and a power generation plan corresponding thereto, and prompt the occupant to select a route. In a case where the power generation plan generation unit 108 generates the power generation plan, the notification control unit 112 may cause the output unit 130 to display content indicating that charging of the battery 60 is unnecessary on days of work.

In a case where the power generation plan is changed, the notification control unit 112 notifies the occupant of information relating to power generation through the output unit 130.

[Generation of Long-term Energy Management Plan]

The power generation plan generation unit 108 generates a long-term energy management plan so as to reduce the number of times the battery 60 is charged as much as possible in order to reduce deterioration of the battery 60. For example, in a case where there is a schedule to commute every day to the first destination which is a place of work on days of work, the power generation plan generation unit 108 sets the SOC of the battery 60 to be in a raised state on Monday, and generates a power generation plan to travel using electric power of the battery 60 on the weekday. Therefore, the power generation plan generation unit 108 sets a power generation plan to charge the battery 60 so as to be in a high SOC during holidays (for example, Saturday and Sunday). In a case where a schedule to go to a destination where traffic congestion is predicted is included on consecutive holidays, the power generation plan generation unit 108 further generates a long-term power generation plan of the battery 60 in which traffic congestion is assumed.

Figure 6:
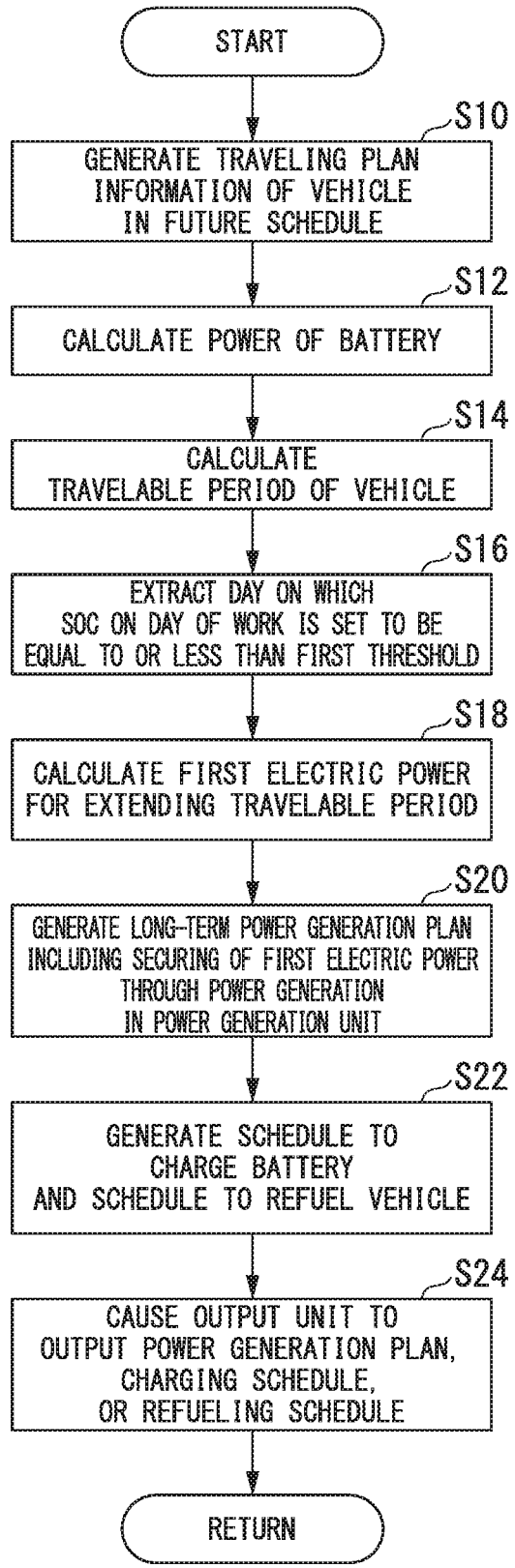
FIG. 6 is a flow chart showing an example of a process for generating a long-term power generation plan which is executed by a power generation plan generation unit.

FIG. 6 is a flow chart showing an example of a process for generating a long-term power generation plan which is executed by the power generation plan generation unit 108. In the present process, for example, in preparation for use of the vehicle M on a day of work after a holiday, the battery 60 is assumed to be charged in a state equal to or more than a target SOC on holidays.

The traveling planning unit 106 generates traveling plan information indicating the traveling plan of the vehicle M in a future schedule (step S10). The power generation plan generation unit 108 calculates, for example, electric power of the battery 60 (step S12).

The power generation plan generation unit 108 calculates, for example, a traveling distance on days of work (for example, Monday to Friday) on the basis of the traveling plan on days of work generated by the traveling planning unit 106, and calculates a travelable period on the basis of the calculated traveling distance and the electric power of the battery 60 (step S14). The power generation plan generation unit 108 extracts a day on which the SOC of the battery 60 on days of work is set to be equal to or less than a first threshold at which charging of the battery 60 is necessary (step S16).

Figure 7:
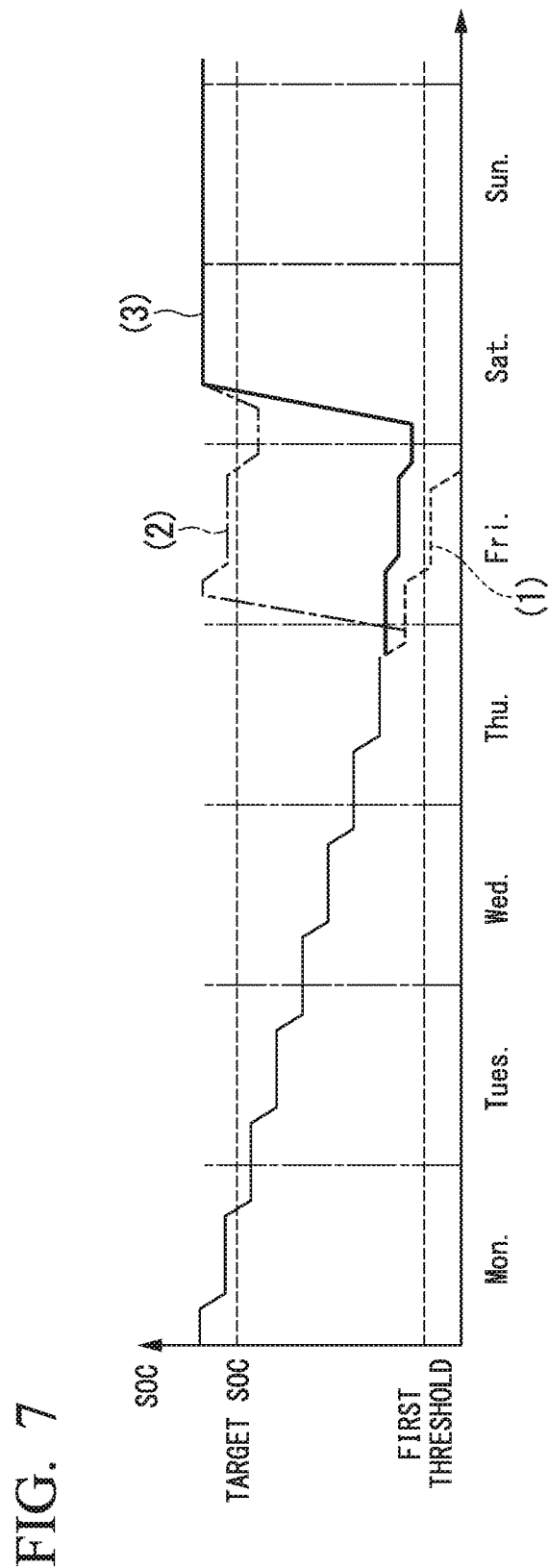
FIG. 7 is a diagram showing an example of long-term energy management (a power generation plan) which is generated by the power generation plan generation unit.

FIG. 7 is a diagram showing an example of a long-term energy management (power generation plan) which is generated by the power generation plan generation unit 108. In the example of FIG. 7, as shown in (1) of the drawing, the SOC of the battery 60 is set to be equal to or less than the first threshold on Friday. Here, in a case where the battery 60 is charged up to a target SOC before commute on Friday on which the SOC of the battery 60 is set to be equal to or less than the first threshold, as shown in (2) of the drawing, in a high SOC on the weekend the battery 60 is charged again up to the target SOC at the beginning of Saturday of the weekend.

In that case, a high SOC of the battery 60 lasts for three consecutive days of Friday, Saturday, and Sunday. In order to suppress deterioration of the battery 60, it is preferable that the state of a high SOC is reduced as much as possible. Consequently, the power generation plan generation unit 108 operates the power generation unit 13 so as not to charge the battery 60 on days of work, and calculates first electric power for extending a travelable period on Friday (step S18).

The power generation plan generation unit 108 generates a long-term power generation plan including the securing of the calculated first electric power through power generation in the power generation unit (step S20). The power generation plan generation unit 108 generates a schedule to charge the battery 60 on the basis of the generated long-term power generation plan (step S22). In this case, the power generation plan generation unit 108 may generate a schedule to refuel the vehicle M. The notification control unit 112 causes the output unit 130 to output the generated power generation plan, charging schedule, or refueling schedule (step S24).

In a case where a series of processes of steps S10 to S24 described above are ended, the plan control unit 100 repeats a series of processes of steps S10 to S24, acquires a schedule for the next predetermined period at predetermined period (for example, a week) intervals, and generates a next long-term power generation plan. Through the control, the state of a high SOC which is the SOC of the battery 60 lasts two days of Saturday and Sunday, and a period in which the state of a high SOC is set is further reduced than in a case where the control is not performed.

[Generation of Normal Energy Management Plan]

The power generation plan generation unit 108 generates a normal energy management plan. The normal power generation plan is generated, for example, for each day or for each trip. The long-term power generation plan is generated for each predetermined period, but a normal traveling plan may be changed and generated by a schedule created on a day in a case that a vehicle is used.

Figure 8:
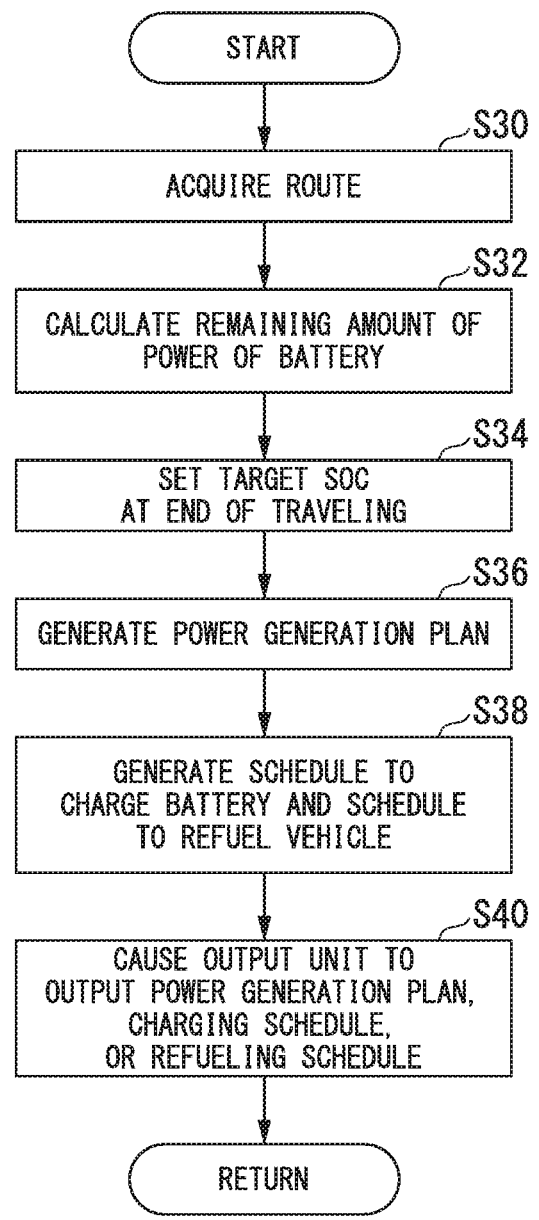
FIG. 8 is a flow chart showing an example of a process for generating a normal power generation plan which is executed by the power generation plan generation unit.

FIG. 8 is a flow chart showing an example of a process for generating a normal power generation plan which is executed by the power generation plan generation unit 108.

The power generation plan generation unit 108 acquires, for example, a route up to the destination of the vehicle M on the basis of the traveling plan information generated by the traveling planning unit 106 (step S30). The power generation plan generation unit 108 calculates the current remaining amount of power of the battery 60 on the basis of the SOC of the battery 60 calculated by the battery control unit 75 (step S32).

The power generation plan generation unit 108 sets a target SOC at the time of the end of traveling of the vehicle M on the basis of the calculated current remaining amount of power of the battery 60 (step S34). The power generation plan generation unit 108 generates the power generation plan of the vehicle M on the basis of the set target SOC at the time of the end of traveling of the vehicle M (step S36). The power generation plan generation unit 108 generates a schedule to charge the battery 60 and a schedule to refuel the vehicle M on the basis of the generated power generation plan (step S38).

The notification control unit 112 causes the output unit 130 to output the generated power generation plan, charging schedule, and refueling schedule (step S40). In a case where a series of processes of steps S30 to S40 described above are ended, the plan control unit 100 repeats the processes of steps S30 to S40 on the basis of another destination or the traveling plan information of a trip, and generates another normal power generation plan. Through the processes, the plan control unit 100 may generate a power generation plan associated with a plurality of routes for one destination.

Through the control, the power generation plan for each day or for each trip is generated, and thus it is possible to manage the SOC of the battery 60 which is close to actual traveling.

The notification control unit 112 causes the output unit 130 to output, for example, a destination according to a schedule in a case that the vehicle M starts to be used. The occupant performs, for example, an operation for approving a displayed destination in a case where there is no change in the destination. The occupant performs an operation for inputting a new destination, for example, in a case where there is a change in the destination. The traveling planning unit 106 generates traveling plan information up to the destination on the basis of the occupant's operation.

[Generation of Integrated Energy Management Plan]

Next, the generation of an integrated energy management plan will be described. The integrated energy management plan is a plan in which the long-term energy management plan and the normal energy management plan are integrated and generated.

Figure 9:
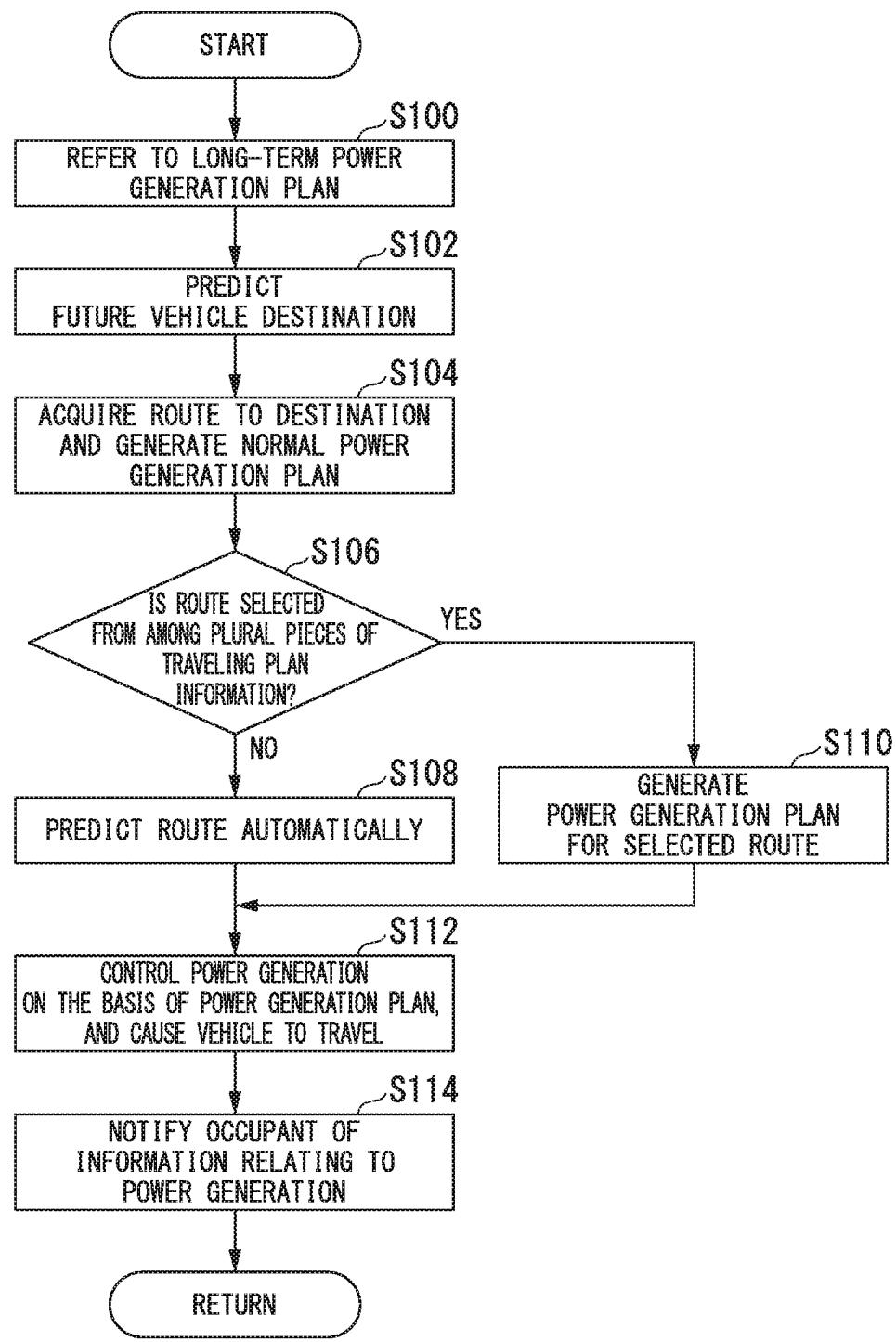
FIG. 9 is a flow chart showing an example of a flow of processes which are executed in the plan control unit.

FIG. 9 is a flow chart showing an example of a flow of processes executed in the plan control unit 100. The power generation plan generation unit 108 refers to the generated long-term power generation plan (step S100). Next, the destination prediction unit 104 predicts a future destination including a destination which is not registered in the occupant's schedule on the basis of the schedule and the date and time information acquired by the schedule acquisition unit 102 (step S102). Here, in a case where there is a change in the occupant's schedule, a destination changed by the destination prediction unit 104 is predicted.

The traveling planning unit 106 generates a route to a destination predicted by the destination prediction unit 104, and generates traveling plan information indicating the traveling plan of the vehicle M in a future schedule in accordance with the generated route (step S104). The power generation plan generation unit 108 determines whether a route has been selected by the occupant from among the plurality of pieces of traveling plan information generated by the traveling planning unit 106 (step S106).

In a case where the selection of a route by the occupant or the indication of a route is not present and a negative determination is obtained in step S106, the power generation plan generation unit 108 selects a route in which the number of times of charging is minimized from among a plurality of routes (step S108). In a case where the selection of a route by the occupant or the indication of a route is present and a positive determination is obtained in step S106, the power generation plan generation unit 108 generates a power generation plan for the selected or indicated route (step S110).

The motive power control unit 70 controls the power generation unit 13 on the basis of a command value which is output by the power generation plan generation unit 108, secures a target amount of power, and controls the second motor 18 or the like to thereby cause the vehicle M to travel (step S112). The notification control unit 112 notifies the occupant of information relating to power generation through the output unit 130 (step S114). The occupant causes the vehicle M to travel to a destination. In a case where the vehicle M is an automated driving vehicle, the vehicle M automatically travels to the destination. In a case where a series of processes of steps S100 to S114 are ended, a traveling history is stored in the storage unit 120, and the flow chart is executed again on the basis of a new schedule.

The power generation plan generation unit 108 refers to, for example, data relating to the vehicle M such as the remaining amount of fuel of the vehicle M, traveling distance, the weight of a burden or the like mounted in the vehicle M, or the number of passengers in addition to the SOC, calculates the amount of power generated in the vehicle M, and appropriately corrects the power generation plan. The weight of a burden or the like is acquired by, for example, a weight sensor mounted in the vehicle M. The number of passengers is acquired on the basis of an analysis result of an image captured by an in-vehicle camera of the vehicle M or a detection result of a weight sensor provided in each seat of the vehicle. For example, the power generation plan generation unit 108 generates a power generation plan corrected so as to increase the amount of power generated as the weight of a burden or the like becomes larger, and as the number of passengers becomes larger.

The power generation plan generation unit 108 may appropriately correct the power generation plan, for example, on the basis of information acquired by a camera mounted in the vehicle M. For example, in a case where information relating to traffic conditions such as traffic congestion is acquired by the camera, the power generation plan generation unit 108 may generate a power generation plan corrected appropriately.

The power generation plan generation unit 108 may appropriately correct the power generation plan, for example, on the basis of temperature information obtained from a sensor. For example, in a case where an air conditioner is used depending on the state of air temperature, the power generation plan generation unit 108 may generate a power generation plan corrected appropriately.

The power generation plan generation unit 108 refers to data relating to the environment of the vehicle M such as position information obtained from a GPS, calculate the amount of power generated in the vehicle M, and appropriately correct the power generation plan. For example, in a case where it is determined that the vehicle M is traveling on a downhill or uphill road which is a sloping road through information based on the GPS, the power generation plan generation unit 108 may generate a power generation plan corrected appropriately.

In a case where there is no schedule on a holiday, the power generation plan generation unit 108 may charge the battery 60 using the charging facility 500 and generate a power generation plan in which the SOC is set to be equal to or greater than a target threshold. The power generation plan generation unit 108 may generate the power generation plan so that charging of the battery 60 in a holiday schedule is performed using power generated by the power generation unit 13 on the way to a set destination or is performed by the charging facility 500 installed at a destination or the like. The power generation plan generation unit 108 outputs a command value to the motive power control unit 70 on the basis of the generated power generation plan.

Figure 10:
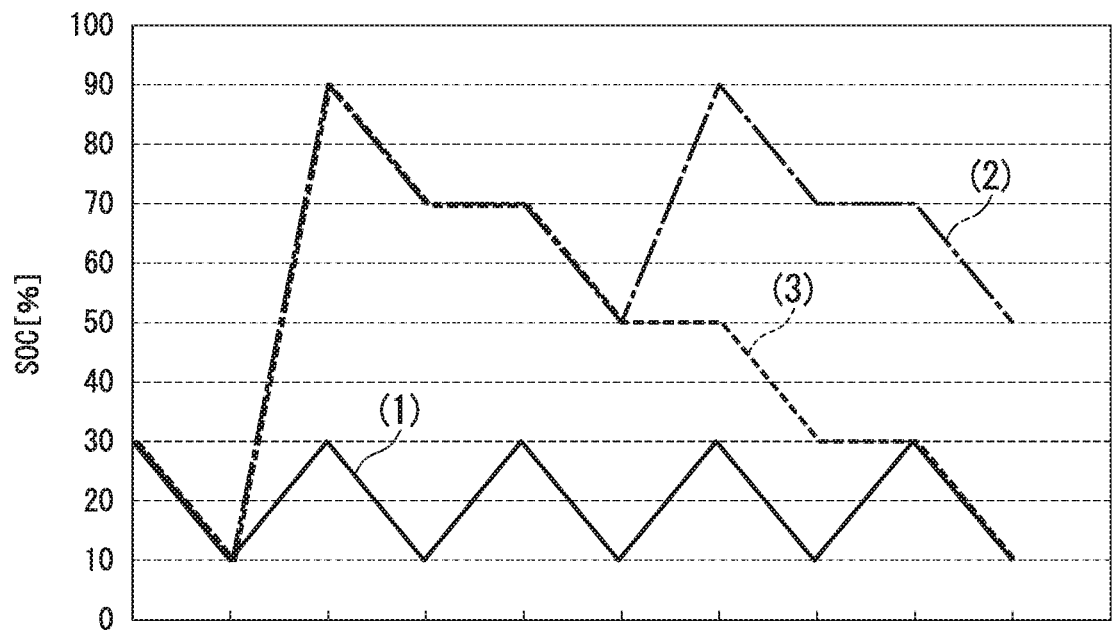
FIG. 10 is a diagram showing an example in which the SOCs of batteries based on different power generation plans are compared with each other.

FIG. 10 is a diagram showing an example in which the SOCs of the battery 60 based on different power generation plans are compared with each other. FIG. 10 shows a power generation plan for a destination which is periodically used. (1) is an SOC in a case where a power generation plan of the battery 60 is generated in units of one trip to a destination which is periodically used. According to (1), the battery 60 is scheduled to be charged every day, for example, on days of work, and thus the number of times the battery 60 is charged increases. (2) is an SOC in a case of traveling to a destination which is periodically used by power of the battery 60 charged to a target SOC (for example, 90[%]) in advance, and a second threshold (for example, 50[%]) of the SOC at which charging of the battery 60 is started is set.

According to (2), the battery 60 is charged, for example, in a case where the SOC is set to be 50[%] of the second threshold. (3) is an SOC of a power generation plan generated by the plan control unit 100 of the present embodiment. According to (3), the battery 60 is not charged during movement to a destination which is periodically used, and the number of times the battery 60 is charged is further reduced than in charging control in (1) or (2).

Figure 11:
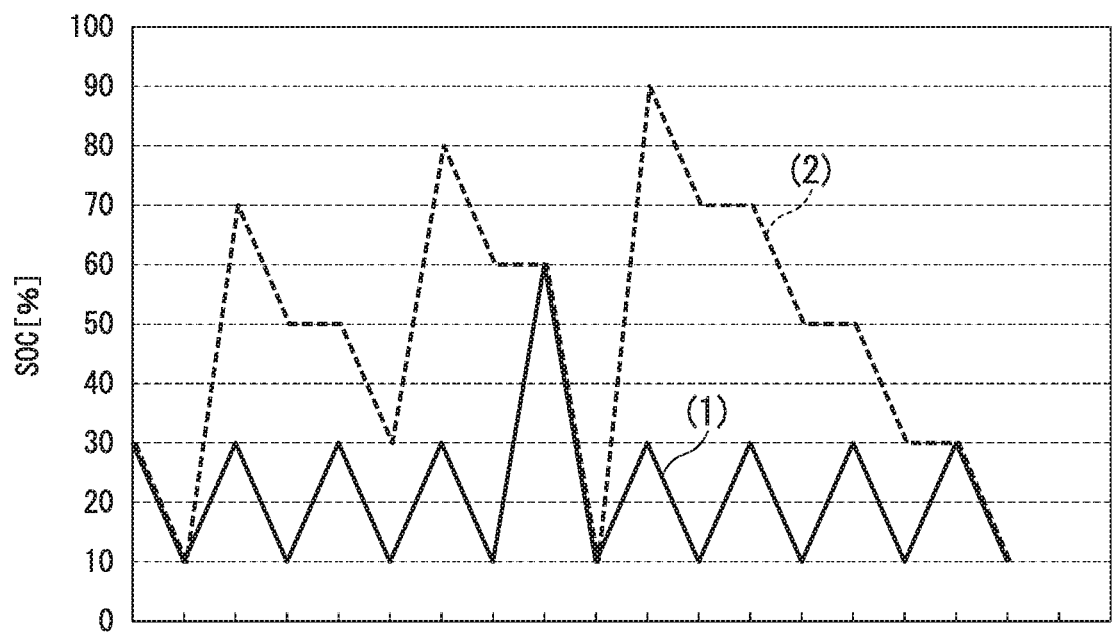
FIG. 11 is a diagram showing an example of a long-term power generation plan.

FIG. 11 is a diagram showing an example of a long-term power generation plan. (1) is an SOC in a case where a power generation plan of the battery 60 is generated in units of one trip to a destination which is periodically used. According to (1), the battery 60 is charged and discharged, for example, for each trip on days of work or holidays. (2) is an SOC of a power generation plan generated by the plan control unit 100 of the present embodiment. According to (2), a power generation plan is generated in advance in a predetermined period on the basis of a future schedule, and the battery 60 is charged in advance in a case where it is expected in advance that power consumption increases and power of the battery 60 is in short supply. According to (2), the number of times the battery 60 is charged is further reduced than in (1).

Figure 12:
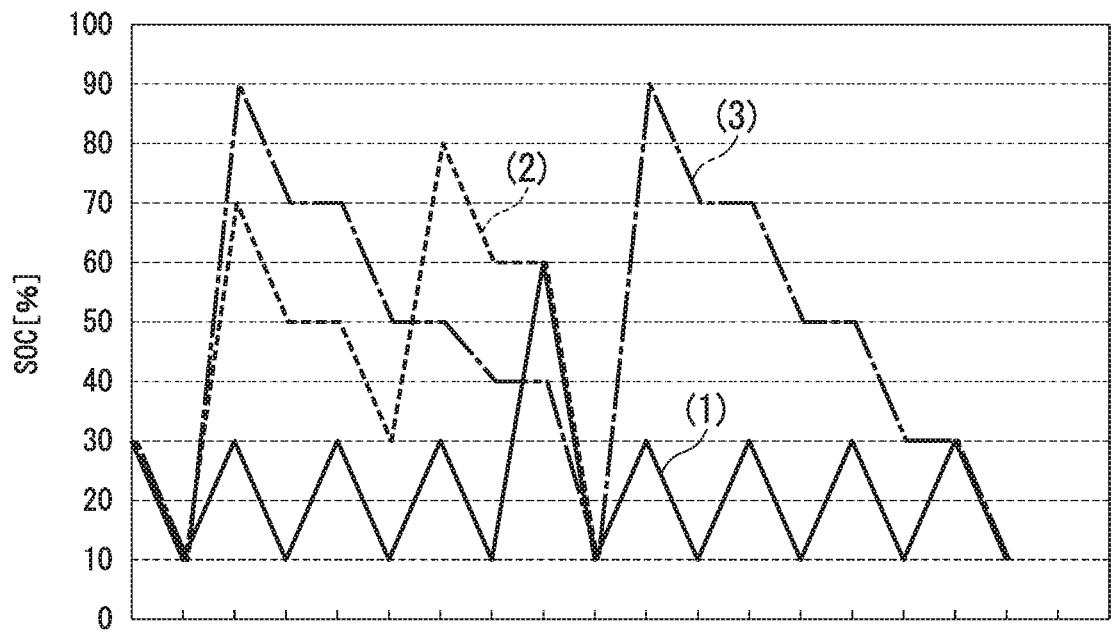
FIG. 12 is a diagram showing an example of a long-term power generation plan in which power generation in a power generation unit 13 is set.

FIG. 12 is a diagram showing an example of a long-term power generation plan in which power generation in the power generation unit 13 is set. (1) is an SOC in a case where a power generation plan of the battery 60 is generated in units of one trip to a destination which is periodically used. In (2), a power generation plan is generated in advance in a predetermined period on the basis of a future schedule, and the battery 60 is charged in advance in a case where it is expected in advance that power consumption increases and power of the battery 60 is in short supply. According to (2), a power generation plan is generated in advance in a predetermined period on the basis of a future schedule, and the battery 60 is charged in advance in a case where it is expected that power consumption increases and it is expected that power of the battery 60 is in short supply.

(3) is an SOC in a case where the power generation unit 13 is operated on the basis of an integrated energy management plan in addition to the process of (2). According to (3), a power generation plan is generated in advance in a predetermined period on the basis of a future schedule, and the shortage of power is compensated for by power generated by the power generation unit 13 without charging the battery 60 in a case where it is expected in advance that power consumption increases and power of the battery 60 is in short supply, whereby the number of times the battery 60 is charged is further reduced than in (1) or (2).

According to the embodiment described above, the vehicle control system 1 can acquire the occupant's future schedule, and generate a future power generation plan according to a schedule. The vehicle control system 1 can predict a destination on days of work on the basis of the past traveling history of even a destination such as a place of work which is not registered in the occupant's future schedule. The vehicle control system 1 can reduce the number of times of charging by generating a power generation plan in a schedule of a predetermined period. In this case, since the vehicle control system 1 generates a power generation plan to reduce the state of a high SOC, it is possible to reduce deterioration of the battery 60.

[Hardware Configuration]

Figure 13:
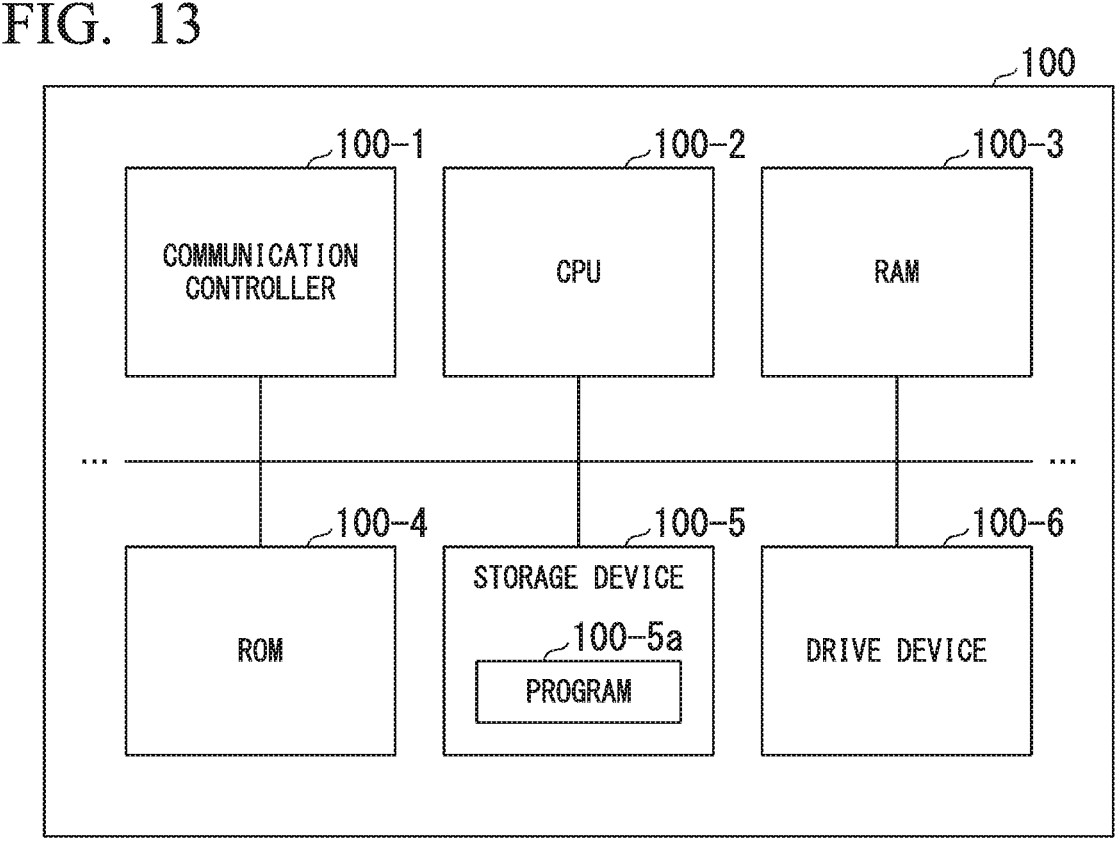
FIG. 13 is a diagram showing an example of a hardware configuration of a plan control unit of an embodiment.

The plan control unit 100 of the vehicle control system 1 of the embodiment described above is realized by, for example, a hardware configuration as shown in FIG. 13. FIG. 13 is a diagram showing an example of a hardware configuration of the plan control unit 100 of an embodiment.

The plan control unit 100 is configured such that a communication controller 100-1, a CPU 100-2, a RAM 100-3, a ROM 100-4, a secondary storage device 100-5 such as a flash memory or an HDD, and a drive device 100-6 are connected to each other through an internal bus or a dedicated communication line. The drive device 100-6 has a portable storage medium such as an optical disc mounted therein. A program 100-5a stored in the secondary storage device 100-5 is developed into the RAM 100-3 by a DMA controller (not shown) or the like and is executed by the CPU 100-2, whereby the plan control unit 100 is realized. The program which is referred to by the CPU 100-2 may be stored in a portable storage medium mounted in the drive device 100-6, or may be downloaded from other devices through the network NW.

The above embodiment can be represented as follows.

A vehicle control system including:

a storage device; and a hardware processor that executes a program stored in the storage device, wherein the hardware processor executes the program, to thereby acquire a schedule of an occupant of a vehicle including a power generation unit including an engine that outputs motive power used by an electric motor and the electric motor that generates power using the motive power which is output by the engine, a storage battery that accumulates power generated by the power generation unit, and an electric motor for traveling, connected to a driving wheel of the vehicle, which rotates the driving wheel by performing drive using power supplied from the power generation unit or the storage battery, predict a future destination including a destination which is not registered in the schedule on the basis of acquired past and future schedules and date and time information, generate traveling plan information indicating a traveling plan of the vehicle in the future schedule in accordance with a route to the predicted destination, and control the power generation unit in the future schedule on the basis of the generated traveling plan information.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:

a power generation unit including an engine that outputs motive power used by an electric motor and the electric motor that generates power using the motive power which is output by the engine;

a storage battery that accumulates power generated by the power generation unit;

an electric motor for traveling, connected to a driving wheel of a vehicle, which rotates the driving wheel by performing drive using power supplied from the power generation unit or the storage battery;

a processor; and a memory communicatively coupled to the processor, the memory having stored therein computer-executable components instructions, the computer-executable components comprising:

an acquisition unit that acquires a schedule of an occupant of a vehicle, a date, and a day of the week associated with each other;

a destination prediction unit that predicts a future destination on the basis of a past schedule and a future schedule of the schedule acquired by the acquisition unit and a traveling history of the vehicle, the future destination which includes a destination not registered in the future schedule, and the traveling history which includes date and time information, a departure point, and a destination;

a traveling planning unit that generates traveling plan information indicating a traveling plan of the vehicle in the future schedule in accordance with a route to the destination predicted by the destination prediction unit; and a power generation control unit that controls the power generation unit in the future schedule on the basis of the traveling plan information generated by the traveling planning unit, wherein the destination prediction unit predicts a first destination of the future destination on the basis of the traveling history at a day that the past schedule is empty, the first destination which is periodically used by the occupant.

2. The vehicle control system according to claim 1, the computer-executable components further comprising a power generation plan generation unit that generates a power generation plan of the power generation unit on the basis of the traveling plan information generated by the traveling planning unit, the power generation plan generation unit generating the power generation plan in which an SOC of the storage battery is determined so that the vehicle travels on the basis of power of the storage battery during a predetermined period in the future schedule,
- wherein the power generation control unit controls the power generation unit on the basis of the power generation plan.

3. The vehicle control system according to claim 2,
- wherein the traveling planning unit generates the traveling plan information in which traffic congestion to the destination is reflected on the basis of the future schedule, the date and time information, the destination, and past traffic congestion information, and
- the power generation plan generation unit generates the power generation plan on the basis of the traveling plan information in which the traffic congestion is reflected.

4. The vehicle control system according to claim 2,
- wherein the power generation plan generation unit compares the SOC of the storage battery with a first threshold in the future schedule, causes the power generation unit to generate power in a case where the SOC is set to be equal to or less than the first threshold, and generates a power generation plan in which the SOC is set to be equal to or greater than a target threshold.

5. The vehicle control system according to claim 2, the computer-executable components further comprising a notification control unit that notifies of the fact that charging of the storage battery is unnecessary in a case where it is predicted by the power generation plan generation unit that charging of the storage battery is unnecessary.

6. The vehicle control system according to claim 2,
- wherein the power generation plan generation unit predicts power consumption of the vehicle and the SOC of the storage battery on the basis of a traveling distance in the traveling plan generated by the traveling planning unit, and generates the power generation plan of the power generation unit.

7. The vehicle control system according to claim 2,
- wherein the traveling planning unit generates traveling plan information associated with a plurality of routes toward the destination predicted by the destination prediction unit, and
- the power generation plan generation unit generates a plurality of power generation plans of the power generation unit with respect to a plurality of pieces of traveling plan information generated by the traveling planning unit, and selects a power generation plan in which the number of times the storage battery is charged is minimized from among the plurality of power generation plans.

8. The vehicle control system according to claim 1,
- wherein the power generation plan generation unit calculates a travelable period in which traveling is possible using the power of the storage battery on the basis of the future schedule, the SOC of the storage battery, and a period in which the first destination is periodically used, and generates the power generation plan to secure power for traveling of the vehicle by causing the power generation unit to generate power so as not to charge the storage battery in a case where the travelable period is shorter than the period in which the first destination is periodically used.

9. A vehicle control method comprising causing a computer to:
- acquire a schedule of an occupant of a vehicle, a date, and a day of the week associated with each other, the vehicle which includes a power generation unit, a storage battery, and an electric motor for traveling, the power generation unit including an engine that outputs motive power used by an electric motor and the electric motor that generates power using the motive power which is output by the engine, the storage battery that accumulates power generated by the power generation unit, and the electric motor for traveling, connected to a driving wheel of the vehicle, which rotates the driving wheel by performing drive using power supplied from the power generation unit or the storage battery;
- predict a future destination on the basis of a past schedule and a future schedule of the acquired schedule and a traveling history of the vehicle, the future destination which includes a destination not registered in the future schedule, and the traveling history which includes date and time information, a departure point, and a destination;
- generate traveling plan information indicating a traveling plan of the vehicle in the future schedule in accordance with a route to the predicted destination;
- control the power generation unit in the future schedule on the basis of the generated traveling plan information, and
- predict a first destination of the future destination on the basis of the traveling history at a day that the past schedule is empty, the first destination which is periodically used by the occupant.

10. A computer readable non-transitory storage medium having a program stored thereon, the program causing a computer to:
- acquire a schedule of an occupant of a vehicle, a date, and a day of the week associated with each other, the vehicle which includes a power generation unit, a storage battery, and an electric motor for traveling, the power generation unit including an engine that outputs motive power used by an electric motor and the electric motor that generates power using the motive power which is output by the engine, the storage battery that accumulates power generated by the power generation unit, and the electric motor for traveling, connected to a driving wheel of the vehicle, which rotates the driving wheel by performing drive using power supplied from the power generation unit or the storage battery;
- predict a future destination on the basis of a past schedule and a future schedule of the acquired schedule and a traveling history of the vehicle, the future destination which includes a destination not registered in the future schedule, and the traveling history which includes date and time information, departure point, and destination;
- generate traveling plan information indicating a traveling plan of the vehicle in the future schedule in accordance with a route to the predicted destination;
- control the power generation unit in the future schedule on the basis of the generated traveling plan information, and
- predict a first destination of the future destination on the basis of the traveling history at a day that the past schedule is empty, the first destination which is periodically used by the occupant.

* * * * *